Dec. 30, 1952     C. G. PULLIN ET AL     2,623,711
MULTIROTOR HELICOPTER

Filed March 3, 1950                       5 Sheets—Sheet 1

Inventors
Cyril George Pullin
Kenneth Watson
By Symmestvedt & Lechner
Attorneys

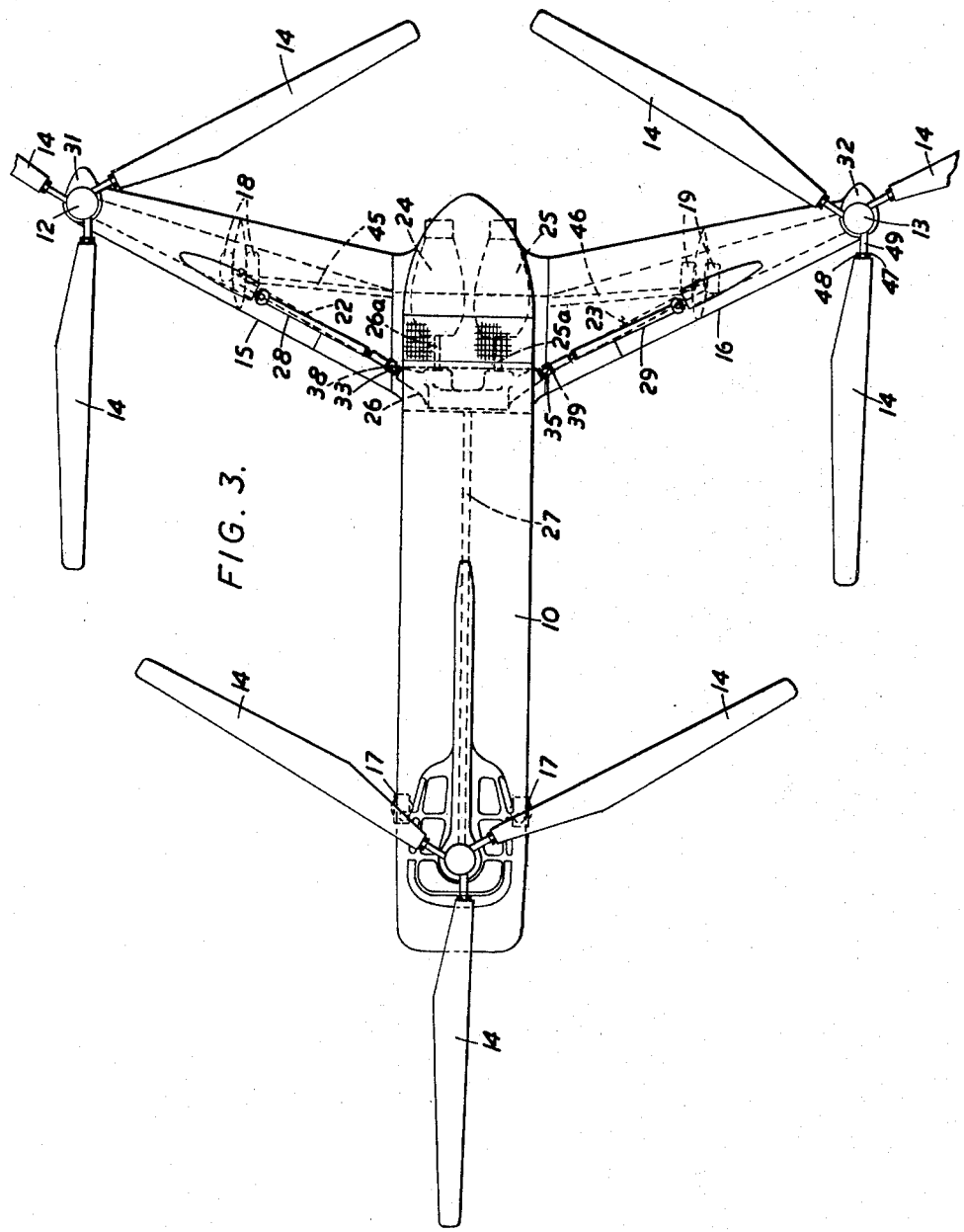

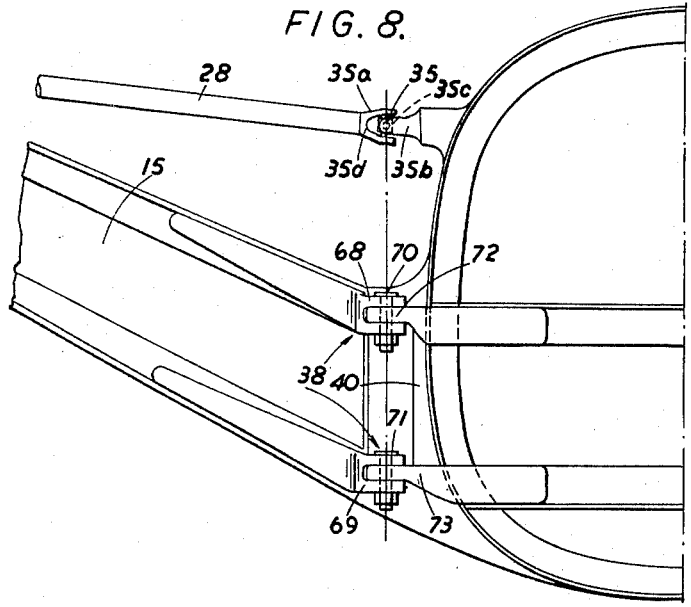
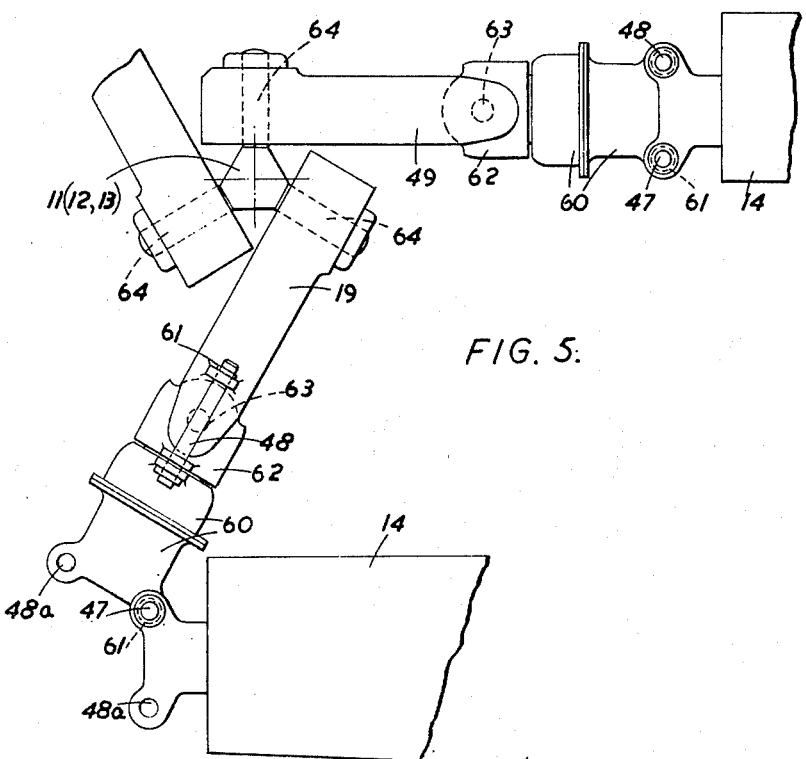

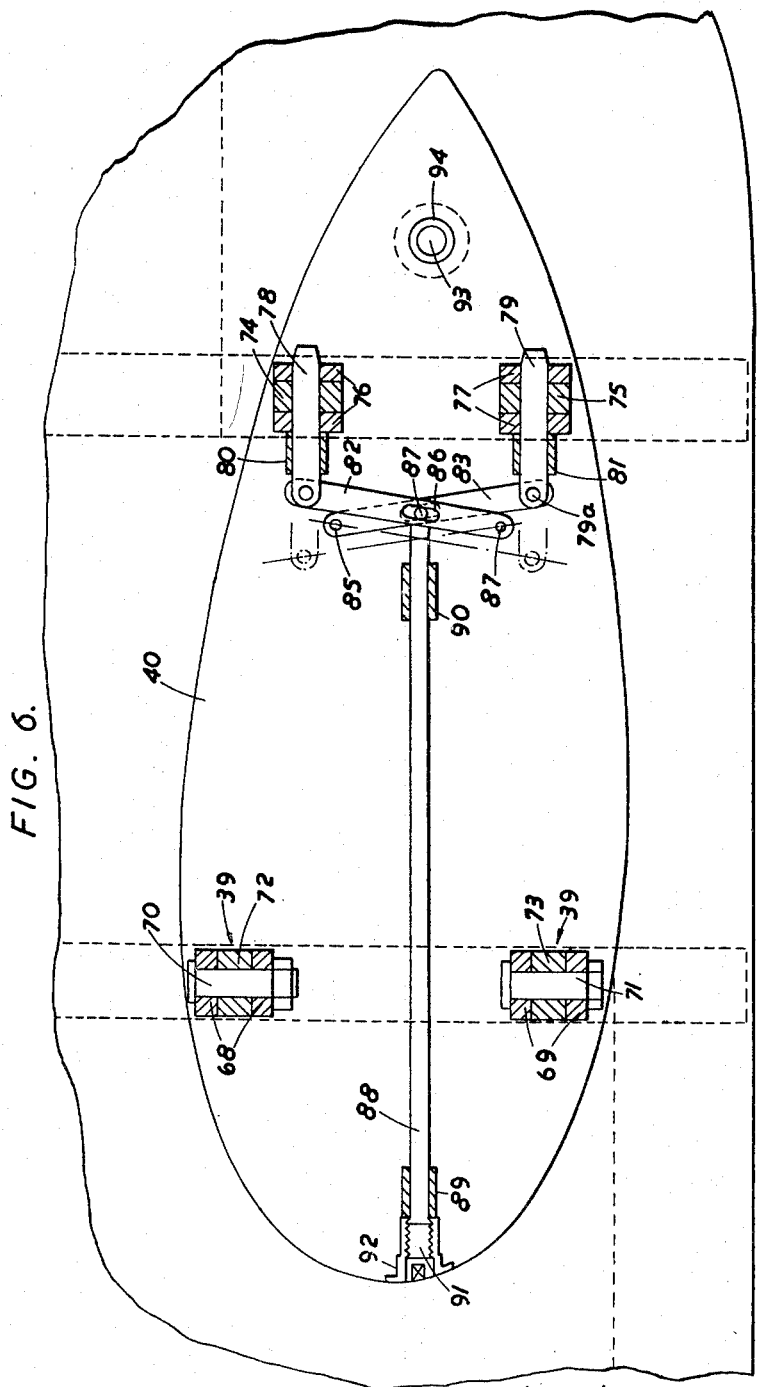

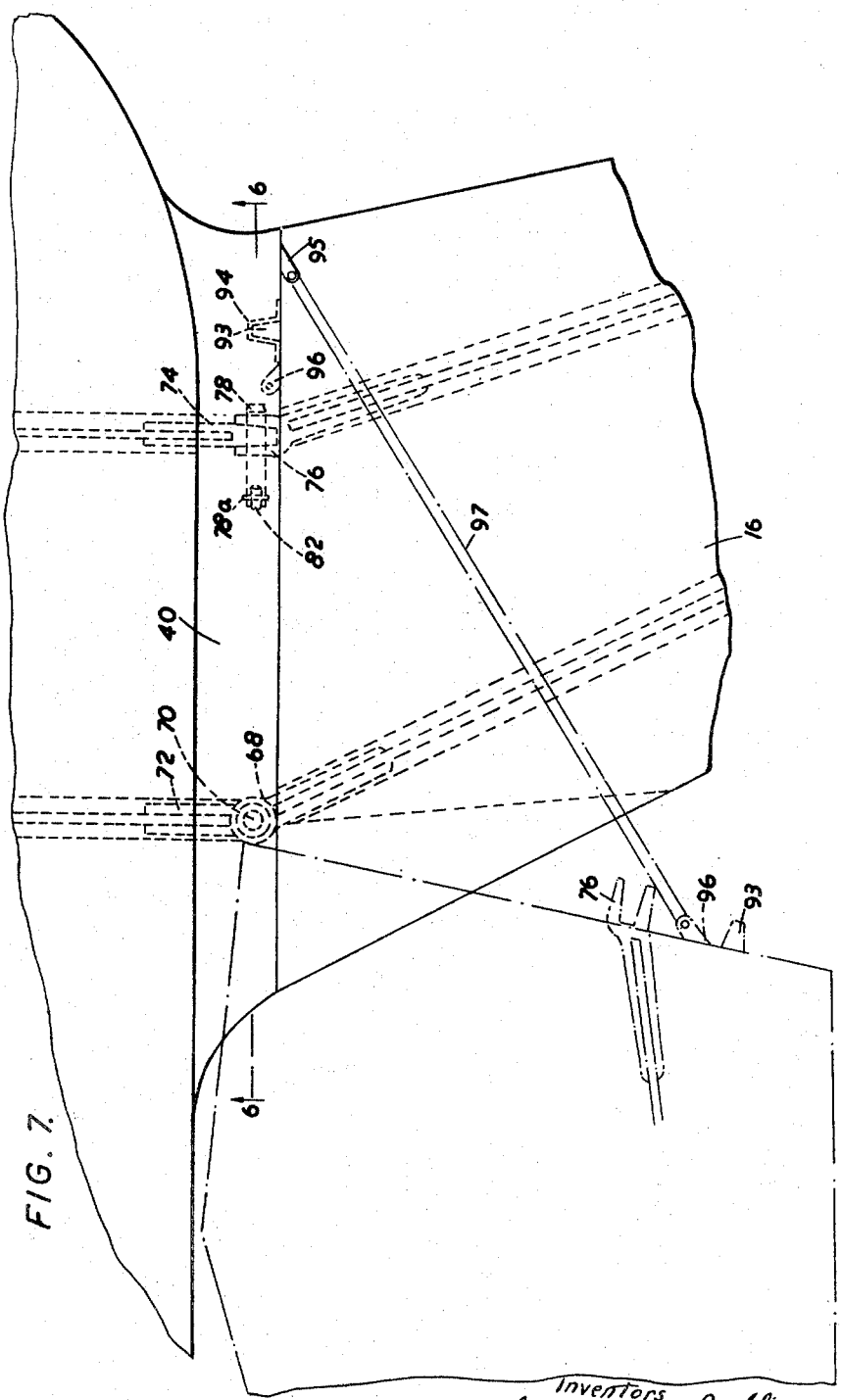

Patented Dec. 30, 1952

2,623,711

UNITED STATES PATENT OFFICE 2,623,711

MULTIROTOR HELICOPTER

Cyril George Pullin, Tadburn, Ampfield, and Kenneth Watson, Woolston, Southampton, England, assignors, by mesne assignments, to Autogiro Company of America, Philadelphia, Pa., a corporation of Delaware Application March 3, 1950, Serial No. 147,374
In Great Britain March 4, 1949

7 Claims. (Cl. 244—17.17)

This invention relates to helicopters having three horizontally spaced sustaining rotors or coaxial pairs of sustaining rotors, and comprising a longitudinally disposed fuselage, a pair of outriggers extending laterally from the fuselage and carrying at their extremities two of the rotors or rotor-pairs and having struts or trusses extending downwardly therefrom as mountings for landing wheels or wheel-assemblies, the third rotor or rotor-pair being mounted on the fuselage in the fore and aft vertical plane of symmetry, either forwardly or rearwardly of the transverse line joining the centres of the two outrigger-mounted rotors and a third landing wheel or wheel-assembly or a pair of such wheels or wheel-assemblies being mounted beneath the forward part of the fuselage. In such an aircraft, the power plant will normally be located in the fuselage and will drive each rotor by transmission shafting, and the shafting driving the lateral outrigger-mounted rotors may be housed at least in part within the outriggers which may conveniently be provided with an aerofoil section contour whereby they serve the function of an auxiliary fixed wing. The undercarriage structure connected to the outriggers may conveniently include vertical telescopic struts having aerofoil section fairings which furnish fixed (or adjustable) keel-surface.

A principal object of the invention is to economise the superficial area occupied by such a helicopter when parked in the open or in a hangar or when stowed on shipboard. To this end it has been customary to arrange the blades of helicopter rotors to fold into parallelism with one another; and this invention provides further that the outriggers shall be foldably mounted to swing forwards or backwards about a vertical hinge-mounting into parallelism with the fuselage. Easily disconnectible attachments are provided for securing the outriggers, when extended, to the fuselage at points offset from the hinge axis.

Further objects of the invention are to provide for the folding of the outriggers without disturbing the undercarriage structure connected to the outriggers, which may continue to be supported on the lateral landing wheels during the folding process, while these wheels roll in arcs struck about the hinge-mountings as centres; and further without dismantling or disconnecting the transmission shafting connecting the power plant with the lateral rotors.

These objects are accomplished by avoiding connections of the outrigger undercarriage structures to the fuselage, any bracing members provided for resisting side or/and drag loading on the main vertical load-carrying members being connected to the outriggers and not to the fuselage; and by providing the lateral transmission shafts with universal joints aligned with axes of the outrigger hinge-mountings.

The folding of the outriggers may bring all the landing wheels forward or aft of the centre of gravity and provision may therefore be made for jacking the unsupported end of the fuselage.

How these and other objects are achieved will be more fully understood from the following description by way of example of a specific embodiment of the invention, the scope of which is defined in the appended claims, with reference to the accompanying drawings, in which, Figure 1 shows a helicopter in side elevation;

Figure 3 is a plan view of the same with outriggers and rotors extended;

Figure 5 is a detail view on an enlarged scale showing one rotor hub and the blade attachments thereto in plan;

Figure 6 is a partial sectional side elevation on an enlarged scale showing the outrigger attachments to the fuselage, taken on the line 6—6 of Figure 7;

Figure 7 is a plan view of the same also on an enlarged scale;

Figure 8 is a view similar to Figure 2, showing part only of the left hand side of Figure 2 on an enlarged scale and including details omitted from Figure 2 and omitting other details.

Figure 1:
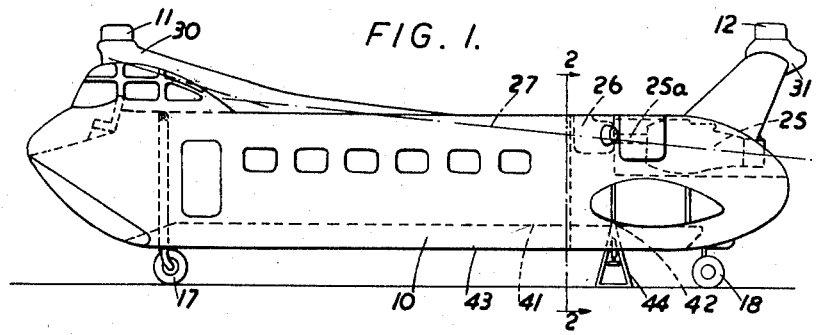
Figure 2:
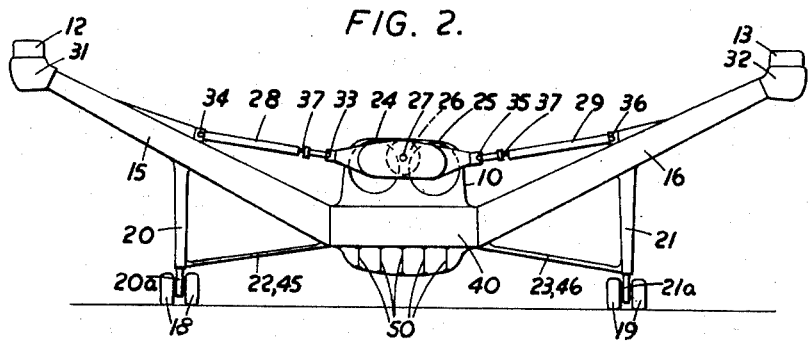
Figure 2 is a sectional end elevation of the same, taken on the line 2—2 of Figure 1, omitting internal details.

The helicopter illustrated has a longitudinally disposed fuselage 10 and three sustaining rotors. The hub 11 of one rotor is mounted at the forward end of the fuselage, and the hubs 12, 13 of the other two rotors are mounted at the ends of outriggers 15, 16 having aerofoil section external contours. Each rotor has three blades 14.

Mounted beneath the forward end of the fuselage is a pair of landing wheels 17, while other pairs of landing wheels 18, 19 are mounted on telescopic, vertical struts 20, 21 extending downwardly from the outriggers. The fixed part of each strut 20, 21 is of aerofoil section and is rigidly attached to the outrigger, to which it is braced against side-loading and drag-loading by struts 22, 45 or 23, 46 (see Figure 3).

The power plant comprises twin gas-turbine motors 24, 25 housed in the rear part of the fuselage; and their shafts 24ᵃ, 25ᵃ are coupled through distributive gearing housed in a distribution gear-box 26 to three transmission shafts 27, 28, 29 respectively driving the central, forward rotor hub 11, and the lateral rotor hubs 12, 13 through gearing enclosed in housings 30, 31, 32. Shafts 28, 29 incorporate universal joints 33, 34 and 35, 36 respectively and include telescopic joints 37, the outboard parts of shafts 28, 29 being housed within the outriggers and the inboard shaft parts between the joints 33, 34 or 35, 36 being exposed.

The outriggers 15, 16 are connected by vertical hinges 38, 39, whose axes are aligned with the universal joints 33, 35 respectively, to a transverse beam 40, integrally built into the fuselage.

The universal joints 33, 35 are so constructed as to be capable of allowing the part of the shafts 28, 29 outboard of the joint to be swung through a large angle exceeding 90° or more relatively to the part of the shafting inboard of the joint, to permit folding of the outriggers. In the example illustrated (see Figure 8) the joint 35 comprises forks 35ᵃ, 35ᵇ and a trunnion block 35ᶜ. The forks are deeply recessed, as shown at 35ᵇ, to enable the outboard fork 35ᵃ to be swung through an angle of more than 110° relatively to the inboard fork 35ᵇ. It will be evident that this can only be done on the assembled aircraft when one or other of the mutually perpendicular trunnion axes of the joint 35 (or 33) is substantially in line with the axis of the outrigger-mounting hinge 39 (or 38).

When extended the outriggers 15, 16 are further secured to the beam 40 to render the structure 15, 16, 40 completely rigid, as shown in Figures 6, 7 and 8.

Referring to these figures, it will be seen that the hinges 39 (or 38) are constituted by two forks 68, 69 secured to the outrigger 16 (or 15) and connected by hinge pins 70, 71 to hinge plates 72, 73 secured to the beam 40. At a position offset rearwards from the axis of these hinges horizontally apertured plates 74, 75 secured to the beam 40 register with horizontally apertured forks 76, 77 secured to the outriggers 16 (or 15) when the outrigger is extended. Pins 78, 79 enter the apertures of the plates 74, 75 and forks 76, 77 to secure the outrigger in the extended position and rigidify the structure. The pins 78, 79 are mounted to slide in guides 80, 81 secured to the beam 40 and are hinged at 78ᵃ, 79ᵃ to links 82, 83 pivoted on the beam 40 at 84, 85 and slotted at 86 to engage a pin 87 on the end of a rod 88 horizontally slidable in guides 89, 90 secured to the beam 40. The forward end of rod 88 is swivellingly jointed to a screw plug 91 which screws into a socket 92 in the leading edge fairing of the beam 40. The outrigger is further located in the extended position by means of a dowel 93 which enters a socket 94 in the end face of the beam 40. The beam 40 and outrigger 16 (or 15) are respectively provided with lugs 95, 96, which, when the outrigger is extended, enter recesses in the outrigger and beam respectively, and when the outrigger is folded serve for the attachment of a jury strut 97, which, when the outrigger is extended, may be stowed in the fuselage.

The fuselage has a strengthened floor 41 stiffened by longitudinal plate webs 50, which are suitably cut away to allow access through a door (not shown) in the outer fairing 43 of the fuselage bottom, to a jacking pad 42 beneath the floor 41, to which a jack 44 can be applied, as shown in Figure 1.

The connection of the rotor blades 14 to their hubs 11, 12, 13 is shown in Figure 5. Each blade 14 is secured by two easily removable pins, 47, 48 respectively, to a root-fitting 60, the pins being retained by circlips 61. The fitting 60 is articulated for pitch-change to a drag link 62, which in turn is articulated on a drag pivot 63 to a blade-root stub 49 (see also Figures 3 and 4), which is itself articulated to the hub 11 (or 12 or 13) by means of a flapping pivot 64.

Folding of the blade is effected by withdrawing one of the two pins 47, 48, say 48, and swinging the blade about the other pin 47. The empty pin holes of the blade 14 and root-fitting 60 are indicated at 48ᵃ in Figures 4 and 5.

When the blade is folded, the drag and pitch-change pivots should be locked and for this purpose the blade-root-fitting 60, the drag link 62 and blade-root stub 49 are provided with apertured lugs 65, 66, 67 through which the removed pin 48 can be inserted to lock the parts 60, 62, 49 together as shown in Figure 5.

Figure 4:
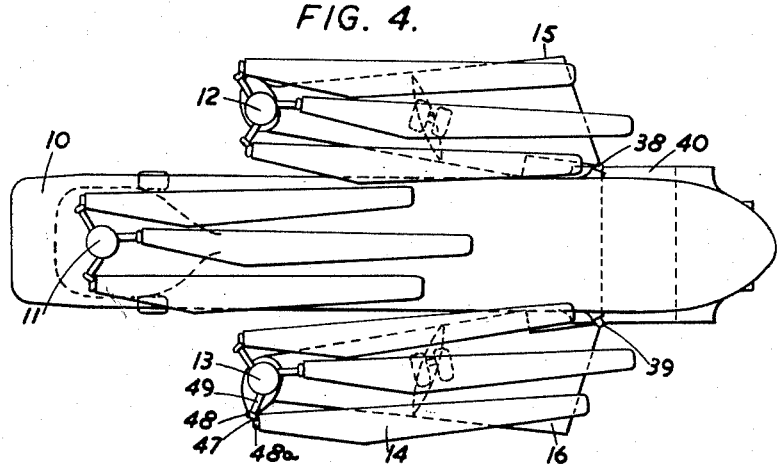
Figure 4 is a view similar to Figure 3, with outriggers and rotor-blades folded.

When it is desired to "fold" the helicopter the rear end of the fuselage is jacked by means of jack 44 placed under pad 42 sufficiently to relieve the load on the lateral wheels 18, 19 and two of the blades 14 of each rotor are folded by withdrawing bolts 47 or 48 and swinging the blades by hand to bring the blades into the positions shown in Figure 4. The rear attachments of the outriggers are then disconnected by unscrewing plugs 91 and pulling out rods 88 to withdraw pins 78, 79 from the plates 74, 75 and forks 76, 77. The outriggers 15, 16 can then be swung forwards on their hinges 38, 39; in this operation the wheels 18, 19 roll in arcs struck about these hinges as centres from the positions shown in Figure 3 to those shown in Figure 4.

The rotors may be "cranked" by hand to bring them and their transmissions into the correct position for folding. This requires that one blade of each outrigger-mounted rotor shall be substantially aligned with the outrigger, giving three alternative rotor-positions separated by 120°, and also that one of the two mutually perpendicular trunnion axes of the universal joint 33 or 35 shall be substantially aligned with the axis of the outrigger-mounting hinge 38 or 39, giving four alternative joint positions separated by 90°. Both these conditions can be satisfied at the same time by appropriate assembly of the transmission, but it will be evident that only one of the three possible rotor-positions can thus be made to coincide with one of the four possible joint-positions, unless the speed ratio of the gearing between the transmission shafts 28, 29 and hubs 12, 13 respectively enclosed in the housings 31, 32 has a particular value, which is an integral multiple of 3 : 4 (shaft to hub), e. g. 15 : 4. In such a case correct positioning is obtainable with any one of the three blades aligned with the outrigger, but in any other case one particular blade must be so aligned and this may be facilitated by furnishing the blade in question with a distinctive marking.

We claim:

1. A helicopter comprising a longitudinally disposed fuselage, a sustaining rotor mounted above it near one end thereof, a landing wheel system mounted below the same end thereof, a lateral outrigger hinged about a vertical axis to each side of the fuselage near the other end thereof, an easily disconnectible fastening for securing each outrigger rigidly to the fuselage in a position extending laterally from the fuselage, a sustaining rotor mounted at the extremity of each outrigger, a rigid structure extending downwardly from each outrigger and a landing wheel mounted on each rigid structure.

2. A helicopter comprising a longitudinally disposed fuselage, a sustaining rotor mounted above it near one end thereof, a landing wheel system mounted below the same end thereof, a lateral outrigger hinged about a vertical axis to each side of the fuselage near the other end thereof, an easily disconnectible fastening for securing each outrigger rigidly to the fuselage in a position extending laterally from the fuselage, a sustaining rotor mounted at the extremity of each outrigger, a power plant housed in the fuselage, transmission means connecting the power plant to each rotor and including lateral transmission shafting connecting the power plant to each outrigger-mounted rotor, said shafting incorporating a universal joint aligned with the axis about which the outrigger is hinged to the fuselage.

3. A helicopter as claimed in claim 2, in which each lateral transmission shafting incorporates a telescopic joint.

4. A helicopter as claimed in claim 2, in which each transmission shafting incorporates a second universal joint outboard of the first-mentioned universal joint.

5. A helicopter comprising a longitudinally disposed fuselage, a sustaining rotor mounted above it near one end thereof, a landing wheel system mounted below the same end thereof, a lateral outrigger hinged about a vertical axis to each side of the fuselage near the other end thereof, an easily disconnectible fastening for securing each outrigger rigidly to the fuselage in a position extending laterally from the fuselage, a sustaining rotor mounted at the extremity of each outrigger, each rotor comprising a hub and a plurality of blades, each attached to the hub by means including an easily disconnectible fastening enabling the blade to be swung horizontally into a folded position when the fastening is disconnected.

6. A helicopter comprising a longitudinally disposed fuselage, a sustaining rotor mounted above it near one end thereof, a landing wheel system mounted below the same end thereof, a lateral outrigger hinged about a vertical axis to each side of the fuselage near the other end thereof, an easily disconnectible fastening for securing each outrigger rigidly to the fuselage in a position extending laterally from the fuselage, a sustaining rotor mounted at the extremity of each outrigger, each rotor comprising a hub and a plurality of blades, each attached to the hub by means including an easily disconnectible fastening and a pivotal connection with substantially vertical axis enabling the blade to be swung horizontally into a folded position when the fastening is disconnected.

7. A rotor-equipped aerial device comprising a body structure, a lateral outrigger mounted to be moved to a position closely adjacent said body structure, a readily releasable fastening for securing the outrigger in a laterally extending position, a sustaining rotor mounted on said outrigger and comprising a hub and a plurality of blades, at least all but one of the blades being attached to the hub by means enabling the blades to be swung into approximate parallelism, whereby the blades and the outrigger may be adjusted to occupy a substantially folded relation to said body structure.

CYRIL GEORGE PULLIN.
KENNETH WATSON.

REFERENCES CITED

The following references are of record in the file of this patent:

UNITED STATES PATENTS

| Number | Name | Date |
|---|---|---|
| D. 155,004 | Gluhareff | Aug. 30, 1949 |
| D. 158,407 | Pullin | May 2, 1950 |
| 1,892,036 | Campens | Dec. 27, 1932 |
| 1,989,544 | Campbell | Jan. 29, 1935 |
| 2,447,118 | Gluhareff | Aug. 17, 1948 |
| 2,514,822 | Wolfe | July 11, 1950 |
| 2,540,404 | Neale | Feb. 6, 1951 |